US007277475B1

(12) United States Patent
Nguyen et al.

(10) Patent No.: US 7,277,475 B1
(45) Date of Patent: Oct. 2, 2007

(54) NARROWBAND INTERFERENCE EXCISION DEVICE

(75) Inventors: Brian Nguyen, San Diego, CA (US); Douglas C. Lawrence, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 935 days.

(21) Appl. No.: 10/672,524

(22) Filed: Sep. 26, 2003

(51) Int. Cl.
*H04B 1/00* (2006.01)
(52) U.S. Cl. .................. 375/148; 375/144; 375/285; 375/346
(58) Field of Classification Search ............ 375/144, 375/148, 285, 346
See application file for complete search history.

(56) References Cited

U.S. PATENT DOCUMENTS

| | | | | |
|---|---|---|---|---|
| 5,263,048 | A * | 11/1993 | Wade | 375/148 |
| 5,410,750 | A * | 4/1995 | Cantwell et al. | 455/306 |
| 5,612,978 | A * | 3/1997 | Blanchard et al. | 375/350 |
| 6,477,196 | B1 * | 11/2002 | Swanke et al. | 375/147 |
| 6,975,673 | B1 * | 12/2005 | Rouquette | 375/149 |
| 2002/0142725 | A1 * | 10/2002 | Clelland et al. | 455/63 |

OTHER PUBLICATIONS

Howard, Narrowband interference rejection using small FFT block sizes Military Communications Conference, 1992. MILCOM '92, Conference Record. "Communications—Fusing Command, Control and Intelligence", IEEE Oct. 11-14, 1992 pp. 608-612 vol. 2.*
Davidovici, "Narrow-band interference rejection using real-time Fourier transforms", IEEE Transactions on Communications, vol. 37, Issue 7, Jul. 1989 pp. 713-722.*
Gevargiz, "Adaptive narrow-band interference rejection in a DS spread-spectrum intercept receiver using transform domain signal processing techniques", IEEE Transactions on Communications, vol. 37, Issue 12, Dec. 1989 pp. 1359-1366□□.*
DiPietro, "An FFT based technique for suppressing narrow-band interference in PN spread spectrum communications systems", 1989 International Conference on Acoustics, Speech, and Signal Processing, 1989. ICASSP-89., May 23-26, 1989 pp. 1360-1363 vol. 2.*

* cited by examiner

*Primary Examiner*—Mohammed Ghayour
*Assistant Examiner*—Juan Alberto Torres
(74) *Attorney, Agent, or Firm*—Peter A. Lipovsky; J. Eric Anderson; Allan Y. Lee

(57) ABSTRACT

A narrowband interference excision method and apparatus. According to one embodiment, a method for narrowband interference excision is disclosed. The method comprising transforming time domain data into a frequency domain vector having a plurality of frequency bins. The method further comprises estimating a plurality of power values corresponding to frequency bins of the frequency domain vector to obtain a current power vector. Then, calculating an average power vector from the current power vector and at least one selected previous power vector. Further, excising selected frequency bins of the frequency domain vector to produce an excised frequency domain vector. Moreover, determining whether to include the average power vector in future average power vector determinations. In another embodiment, a narrowband interference excision apparatus is disclosed.

21 Claims, 10 Drawing Sheets

NARROWBAND INTERFERENCE EXCISION DEVICE

BACKGROUND OF THE INVENTION

The present invention is generally in the field of wireless communication. More specifically, the invention is in the field of wireless communication receivers using interference removal.

Wireless communication systems include transmitters capable of transmitting radio frequency (rf) signals to receivers. Specifically, transmitters transmit a desired rf signal and receivers receive a received rf signal comprising the desired rf signal, noise and interference. Noise is defined as non-local (with respect to the receiver) unwanted rf signals, which can be caused by, for example, biological sonar, rf jammers and solar flares. Interference is defined as local (with respect to the receiver) unwanted rf signals, which can be caused by, for example, electromagnetic radiation from electrical equipment and power lines in close proximity to receivers. Wireless communication systems attempt to improve reception quality by eliminating or reducing interference.

Hardware notch filtering is a typical method for reducing narrowband interference in wireless communication system receivers. Hardware notch filtering uses an external reference signal to create notch filters notched at the fundamental and harmonic frequencies of the external reference signal. The hardware notch filters operate in the time domain to remove or reduce narrowband interference from received rf signals. Disadvantageously, hardware notch filtering requires external references, cannot remove strong narrowband interference and can require multiple notch filters.

Typical excision devices attempt to reduce narrowband interference in wireless communication system receivers by operating in the frequency domain, which does not require external references. Typical excision devices include a transformer, a power estimator, an excisor and an inverse transformer. The transformer performs "windowing" (e.g., Blackman windowing) and the well-known Fast-Fourier Transform (FFT) on a received signal to transform the received signal from the time domain to the frequency domain. Windowing techniques are described in more detail in an article published by the Proceedings of the IEEE in 1978, entitled "On the Use of Windows for Harmonic Analysis with the Discrete Fourier Transform", authored by Frederic J. Harris, which is hereby incorporated by reference in its entirety for its teachings on windowing techniques. The FFT is described in more detail in a book published by Macmillan in 1988, entitled "Introduction to Digital Signal Processing", authored by J. G. Proakis et al., which is hereby incorporated by reference in its entirety for its teachings on the FFT. The power estimator receives frequency domain data from the transformer and determines a power vector. The excisor receives frequency domain data from the transformer and the power vector from the power estimator. The excisor removes narrowband interference by determining whether the power vector exceeds an excision threshold. The inverse transformer receives frequency domain data from the excisor and inverse transforms the data into time domain data. Disadvantageously, typical excision devices cannot adapt to noisy changes in environment. For example, high impulsive noise (i.e., short duration, high-amplitude noise) and high interference precludes typical excision devices from removing narrowband interference in Extremely Low Frequency (ELF) communications.

Therefore, a need exists for narrowband interference excision devices that do not require an external reference for narrowband interference. In addition, a need exists for a method and apparatus for narrowband interference excision devices that operates in high impulsive noise and high interference environments.

SUMMARY OF THE INVENTION

The present invention is directed to a method and apparatus for narrowband interference excision. The invention overcomes the need in the art for narrowband interference excision devices that do not require an external reference for narrowband interference and that operate in high impulsive noise and high interference environments.

The present inventive narrowband interference excision device method and apparatus uses a transient eliminator and a moving average calculator to remove high-amplitude interference. The present invention is capable of removing high-amplitude interference in high impulsive noise and high-interference environments without external references. The method and apparatus is particularly useful in ELF communication systems According to one embodiment, the present invention is a method for narrowband interference excision. The method comprises a step of transforming time domain data into a frequency domain vector having a plurality of frequency bins. Next, the method estimates a plurality of power values corresponding to frequency bins of the frequency domain vector to obtain a current power vector. Then, the method calculates an average power vector from the current power vector and at least one selected previous power vector. Further, the method excises selected frequency bins of the frequency domain vector to produce an excised frequency domain vector. Moreover, the method determines whether to include the average power vector in future average power vector determinations.

According to another embodiment, the present invention is a narrowband interference excision device, where the narrowband interference excision device includes a transformer, power estimator, moving average calculator, excisor and transient eliminator. The transformer is capable of transforming time domain data to a frequency domain vector comprising a plurality of frequency bins. The power estimator is operatively coupled to the transformer and capable of receiving the frequency domain vector and adapted to determine a PXW power vector comprising a plurality of power values that correspond to the plurality of frequency bins. The moving average calculator is operatively coupled to the power estimator and is capable of receiving the PXW power vector and a discard flag. The moving average calculator is adapted to determine an average power vector. The excisor is operatively coupled to the transformer and is capable of receiving the frequency domain vector and the average power vector. The excisor is adapted to excise selected frequency bins of the plurality of frequency bins and determine an excised power vector and an excision flag vector. The transient eliminator is operatively coupled to the excisor and the moving average calculator and is capable of receiving the excision flag vector. The transient eliminator is adapted to determine whether to include the average power vector from future average power vector determinations and determine the discard flag.

The previously summarized features and advantages along with other aspects of the present invention will become clearer upon review of the following specification taken together with the included drawings.

DETAILED DESCRIPTION OF THE INVENTION

The present invention is directed to a method and apparatus for narrowband interference excision devices. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention that use the principles of the present invention are not specifically described in the present application and are not specifically illustrated by the present drawings.

The present inventive narrowband interference excision device method and apparatus uses a transient eliminator and a moving average calculator to remove high-amplitude interference. The present invention is capable of removing high-amplitude interference in high impulsive noise and high-interference environments without external references. The method and apparatus is particularly useful in ELF communication systems.

Figure 1:
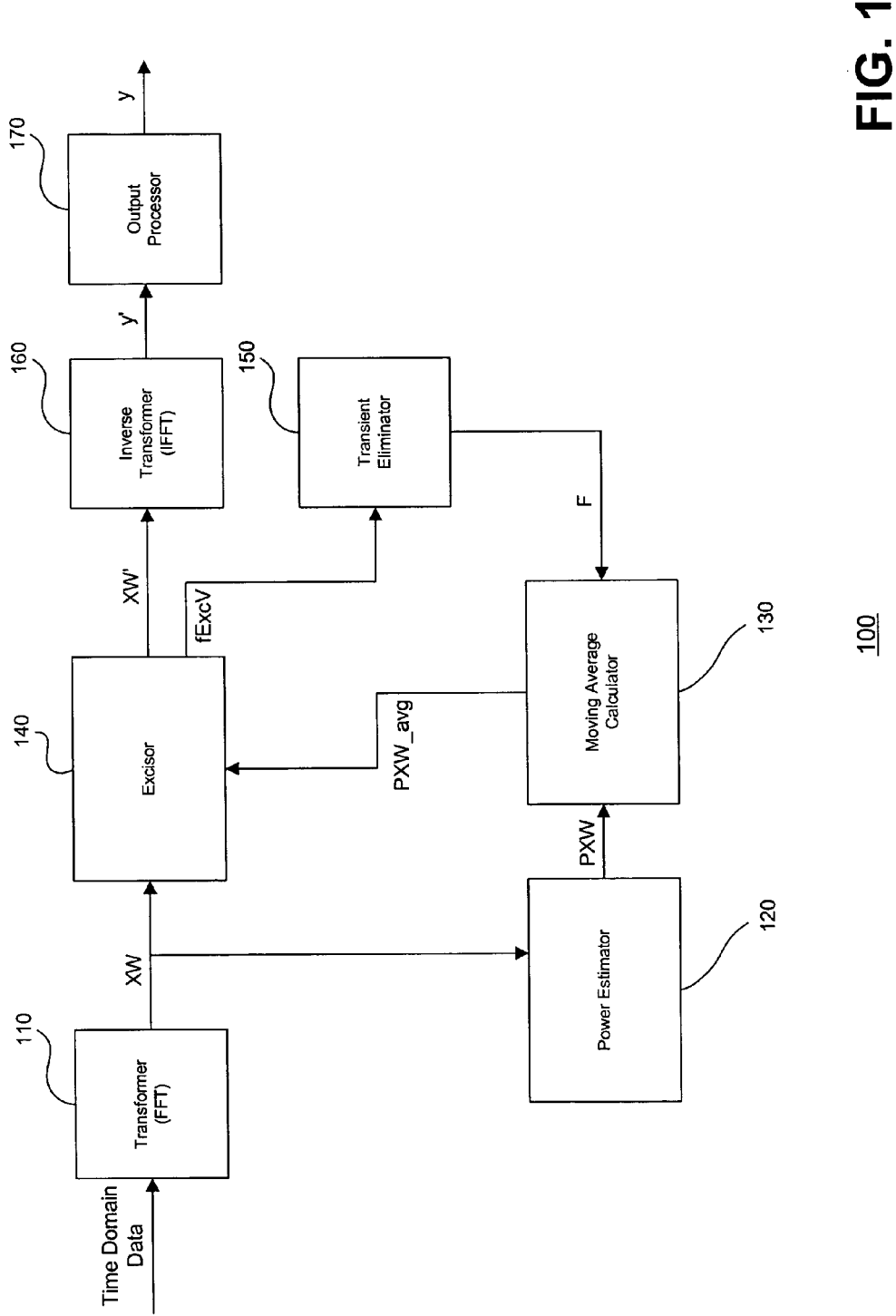
FIG. 1 is a block diagram representing a narrowband interference excision device according to one embodiment of the invention.

FIG. 1 is a block diagram representing a narrowband interference excision device according to one embodiment of the invention. As shown in FIG. 1, narrowband interference excision device 100 includes transformer 110, power estimator 120, moving average calculator 130, excisor 140, transient eliminator 150, inverse transformer 160 and output processor 170. Transformer 110 receives time domain data, assembles time domain data blocks and transforms time domain data blocks into frequency domain data. In one embodiment, transformer 10 uses a FFT to transform time domain data into frequency domain data. Those skilled in the art shall recognize that other methods that transform time domain data into frequency domain data can be used with the present invention without departing from the scope and spirit of the present invention. In one embodiment, transformer 10 uses an "overlap-and-add process" and a windowing technique to assemble time domain data blocks. Transformer 110 inputs frequency domain data blocks to power estimator 120 and excisor 140.

Figure 2:
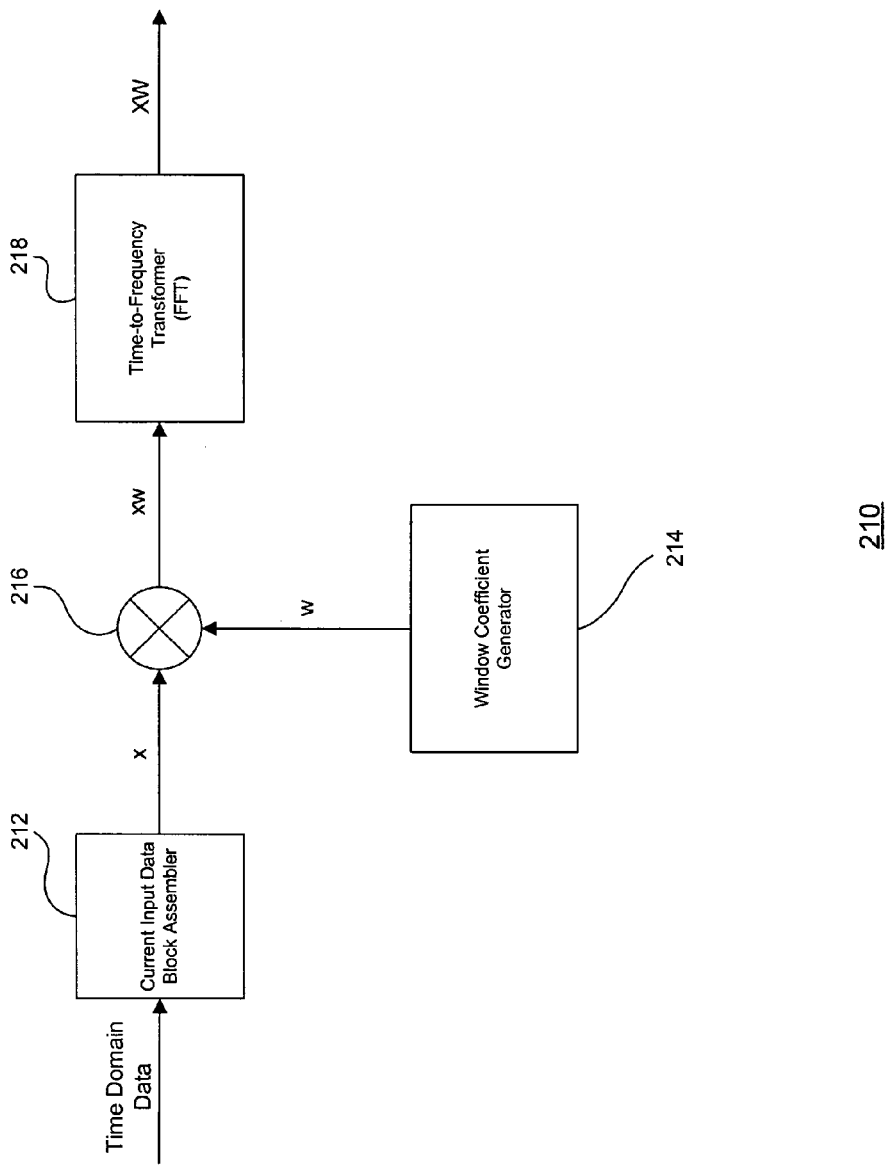
FIG. 2 is a block diagram representing a transformer of a narrowband interference excision device according to one embodiment of the invention.

FIG. 2 is a block diagram representing a transformer of a narrowband interference excision device according to one embodiment of the invention. As shown in FIG. 2, transformer 210 includes current input data block assembler 212, window coefficient generator 214, multiplier 216 and time-to-frequency transformer 218. Current input data block assembler 212 receives time domain data and assembles the data into data blocks (i.e., vectors) having a length N. In one embodiment, N is selected as a power of 2 to increase transformation efficiency and provide adequate frequency resolution and bin signal-to-noise ratio (SNR) for specific applications. For example, N equals 16K (i.e., 16*1024) in an ELF receiver application. In one embodiment, assembler 212 uses a "75% overlap-and-add process" to assemble data blocks from time domain data. The 75% overlap-and-add process appends 25% of a new data block to 75% of a previous data block to form data vector "x" having a length N. Assembler 212 inputs data vector x to multiplier 216.

Window coefficient generator 214 of transformer 210 of FIG. 2 inputs a window coefficient vector "w" to multiplier 216. In one embodiment, generator 214 uses a Blackman window coefficient vector according to the following Equation 1:

$$w(n) = 0.42 + (0.50*\cos(2\Pi n/N)) + (0.08*\cos(4\Pi n/N)); \quad \text{(Equation 1)}$$

$$\text{where } -\frac{N}{2} \le n \le \frac{N}{2};$$

w(n)=Blackman window coefficient; and
N=window size.

In one embodiment, the Blackman window coefficient vector is generated as a periodic function having no symmetry at end points. Generator 214 inputs window coefficient vector w to multiplier 216.

Multiplier 216 receives data vector x from assembler 212 and window coefficient vector w from generator 214. Multiplier 216 multiplies data vector x by window coefficient vector w to obtain windowed vector "xw" and inputs windowed vector xw to time-to-frequency transformer 218.

Transformer 218 transforms windowed vector xw from the time domain to the frequency domain to produce frequency domain vector "XW," which comprises a plurality of frequency bins. In one embodiment, transformer 218 uses a FFT having a block size N according to the following Equation 2:

$$X(k) = \sum_{n=0}^{N-1} x(n)e^{(-j2\Pi nk/N)}; \quad \text{(Equation 2)}$$

where $0 \le k \le (N-1)$
X(k)=frequency domain output;
x(k)=time domain input; and
N=FFT block size.

Transformer 218 outputs frequency domain vector XW.

Referring again to FIG. 1, power estimator 120 receives frequency domain vector XW from transformer 110. Power estimator 120 estimates power values of frequency bins of frequency domain vector XW. In one embodiment, power estimator 120 multiplies frequency domain vector XW by its complex conjugate to obtain power vector "PXW." Thus, a power value is computed for each frequency bin. Power vector PXW comprises a plurality of power values corresponding to frequency bins. Power estimator 120 inputs power vector PXW to moving average calculator 130.

As shown in FIG. 1, moving average calculator 130 receives power vector PXW from power estimator 120 and discard flag "F" from transient eliminator 150. According to the invention, calculator 130 scales power values of frequency bins of power vector PXW using a power scale factor vector PSFV to obtain scaled power vector "PXW'," which reduces suppression of high-amplitude frequency bins of the current power vector PXW when calculating average power vector PXW_avg. Calculator 130 determines average power vector PXW_avg from scaled power vector PXW', previous power vectors PXW and power scale factor vector PSFV. Calculator 130 uses discard flag F to determine whether to discard or retain the current power vector PXW in future calculations of average power vector PXW_avg. Calculator 130 inputs average power vector PXW_avg to excisor 140.

Figure 3:
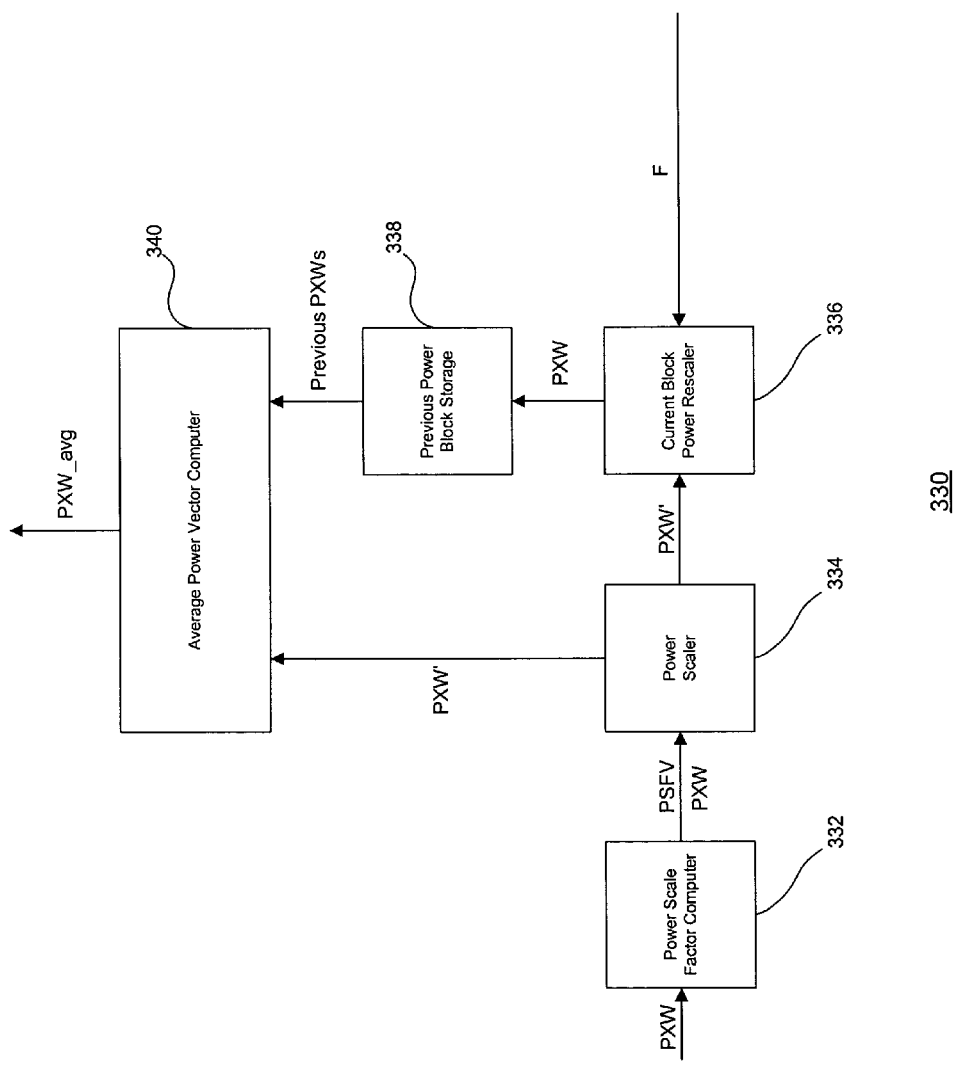
FIG. 3 is a block diagram representing a moving average calculator of a narrowband interference excision device according to one embodiment of the invention.

FIG. 3 is a block diagram representing a moving average calculator of a narrowband interference excision device according to one embodiment of the invention. As shown in FIG. 3, moving average calculator 330 includes power scale factor computer 332, power scaler 334, current block power rescaler 336, previous power block storage 338 and average power vector computer 340. Power scale factor (PSF) computer 332 receives current power vector PXW and determines a power scale factor PSF for frequency bins of current power vector PXW. In one embodiment of PSF computer 332, if the power value of a frequency bin is less than a threshold "T," the PSF for the frequency bin is set to 1, else the PSF is set to "M." M is the number of blocks used for averaging in average power vector computer 340 as described below. In one embodiment, M ranges between 5 and 10, inclusive. The PSF computer 332 calculates threshold T for frequency bins. In one embodiment, threshold T is calculated by the following Equation 3:

$$T = M \times PXW\_avg; \qquad \text{(Equation 3)}$$

where
T=threshold for a frequency bin;
M=number of blocks used for averaging; and
PXW_avg=average power for a frequency bin.

Power scale factor vector PSFV comprises power scale factors corresponding to frequency bins. PSF computer 332 inputs power scale factor vector PSFV and current power vector PXW to power scaler 334.

Power scaler 334 receives current power vector PXW and power scale factor vector PSFV. Power scaler 334 determines a scaled power vector PXW'. In one embodiment, power scaler 334 receives current power vector PXW from power estimator 120 of FIG. 1. In one embodiment, power scaler 334 receives current power vector PXW from PSF computer 332. Power scaler 334 receives power scale factor vector PSFV from PSF computer 332. Scaled power vector PXW' is calculated by multiplying power vector PXW by power scale factor vector PSFV. Power scaler 334 inputs scaled power vector PXW' to average power vector computer 340 and current block power rescaler 336.

Average power vector computer 340 receives scaled power vector PXW' and previous power vectors PXW. Average power vector computer 340 determines an average power vector PXW_avg. In one embodiment, average power vector PXW_avg is calculated by the following Equation 4:

$$PXW\_avg = \frac{PXW' + \sum_{n=1}^{-(M-1)} (PXW(n))}{M} \qquad \text{(Equation 4)}$$

where
PXW_avg=average power vector
PXW'=scaled power vector
PXW(n)=$n^{th}$ power vector
M=number of blocks used for averaging According to the invention, scaled power vector PXW' helps avoid suppressing high-amplitude power values in frequency bins of power vector PXW when determining average power vector PXW_avg. Average power vector computer 340 outputs average power vector PXW_avg.

Current block power rescaler 336 receives scaled power vector PXW' and discard flag F. Current block power rescaler 336 determines power vector PXW. Current block power rescaler 336 can determine power vector PXW by rescaling scaled power vector PXW'. In one embodiment, power vector PXW is calculated by dividing scaled power vector PXW' by power scale factor vector PSFV. In one embodiment, current power block rescaler 336 determines power vector PXW by receiving power vector PXW from power estimator 120 of FIG. 1. If discard flag F indicates retaining current power vector PXW for future averaging by average power vector computer 340, then current power block rescaler 336 inputs current power vector PXW to previous power block storage 338.

Previous power block storage 338 receives power vectors PXW from current block power rescaler 336. Storage 338 inputs previous power vectors PXW to average power vector computer 340 for use in determining average power vector PXW_avg.

Referring again to FIG. 1, excisor 140 receives frequency domain vector XW from transformer 10 and average power vector PXW_avg from moving average calculator 130. Excisor 140 excises selected frequency bins of frequency domain vector XW based on moving averages of frequency bin values of average power vector PXW_avg. Excisor 140 determines an excised frequency domain vector XW' and excision flag vector fcxcV. Excisor 140 inputs excised frequency domain vector XW' to inverse transformer 160. Excisor 140 inputs excision flag vector fExcV to transient eliminator 150.

In one embodiment of excisor 140, average power vector PXW_avg is used to determine median vector MED, which is used to determine whether to excise selected frequency bins. Median vector MED comprises median values corresponding to frequency bins, where a median value for a specific frequency bin is determined by calculating the median of a set of frequency bins that includes the specific frequency bin. For example, the median value for a specific frequency bin is determined by calculating the median of a set of frequency bins comprising seven frequency bins that are centered on the specific frequency bin (i.e., the specific frequency bin and the three frequency bins immediately lower and three frequency bins immediately higher than the specific frequency bin).

Excisor 140 compares average power vector PXW_avg to scaled median vector SMED. Scaled median vector SMED is calculated by multiplying median vector MED by median threshold MF_T. The value of median threshold MF_T is selected based on the requirements of an application. Median threshold MF_T should be set high enough to prevent erroneous frequency bin excisions due to random noise. In one embodiment, median threshold MF_T ranges between approximately 6 dB and approximately 12 dB, inclusive.

Excisor 140 determines whether an average power value of a frequency bin of average power vector PXW_avg exceeds a scaled median value of a frequency bin of scaled median vector SMED, and if so, excision flag fExc is set to 1, otherwise, to 0. A frequency bin of frequency domain vector XW is excised if current excision flag fExc and previous excision flag fExc are both set to 1. Excising a frequency bin based on two consecutive excision flags fExc helps reduce erroneous excisions due to random noise and other transients. Excision flag vector fExcV comprises current excision flags fExc corresponding to frequency bins. Excision flag vector fExcV is input to transient eliminator 150. Excised frequency domain vector XW' comprises unexcised frequency bins of frequency domain vector XW. Excised frequency domain vector XW' is input to inverse transformer 160.

As shown in FIG. 1, transient eliminator 150 receives excision flag vector fExcV from excisor 140. According to the present invention, transient eliminator 150 determines excision percentage pExc from excision flag vector fExcV and determines whether current power vector PXW should be included in future calculations of average power vector PXW_avg. In one embodiment, transient eliminator 150 detects transient conditions based on a ratio between current excision percentage pExc and previous excision percentage pExc. When transient conditions are detected, transient eliminator 150 sets discard flag F to 1, which indicates that the current power vector PXW should not be included in future calculations of average power vector PXW_avg. In one embodiment, transient eliminator 150 limits the number of power vectors PXW that can be consecutively excised. For example, transient eliminator 150 can limit consecutive excision to only three consecutive power vectors PXW. Transient eliminator 150 inputs discard flag F to moving average calculator 130.

Figure 4:
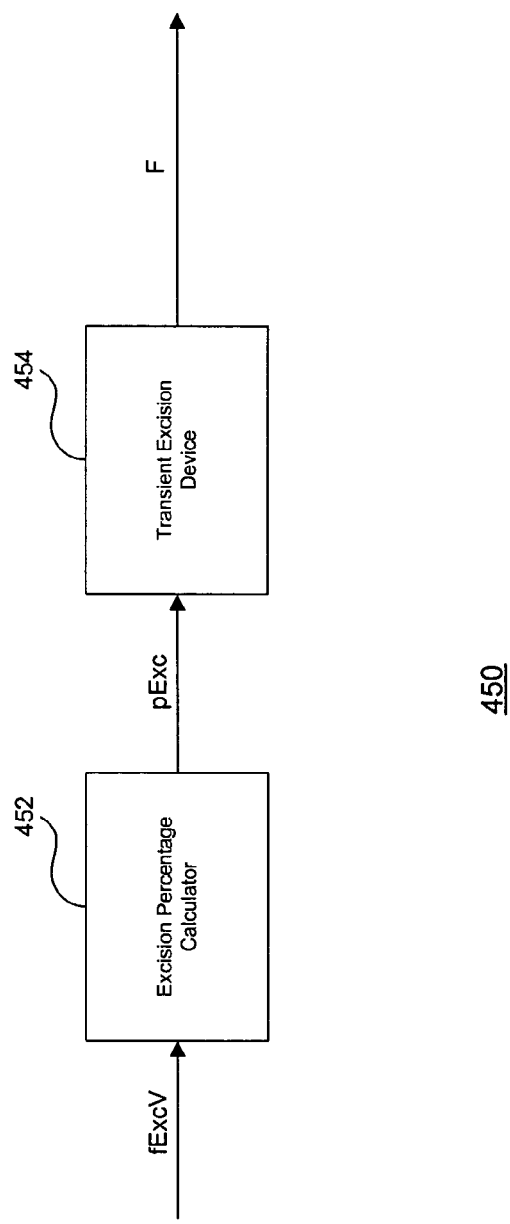
FIG. 4 is a block diagram representing a transient eliminator of a narrowband interference excision device according to one embodiment of the invention.

FIG. 4 is a block diagram representing a transient eliminator of a narrowband interference excision device according to one embodiment of the invention. As shown in FIG. 4, transient eliminator 450 includes excision percentage calculator 452 and transient excision device 454. Excision percentage calculator 452 receives excision flag vector fExcV having a length N. Excision percentage calculator 452 calculates excision percentage pExc by dividing the summation of excision flags fExc of excision flag vector fExcV by length N. Excision percentage calculator 452 inputs excision percentage pExc to transient excision device 454.

As shown in FIG. 4, transient excision device 454 receives excision percentage pExc. Transient excision device 454 determines the ratio between current excision percentage pExc and previous excision percentage pExc and compares this ratio to a transient condition threshold. If the ratio is greater than the transient condition threshold, exceed counter cExc is incremented by 1 and transient excision device 454 determines whether to set discard flag F to 1. Discard flag F is set to 1 if the ratio is greater than the transient condition threshold and exceed counter cExc is less than a predetermined limit such as three. If the ratio is less than or equal to the transient condition threshold, the exceed counter is set to 0 and current power vector PXW is retained (i.e., used in future average power vector PXW_avg calculations). When discard flag F is set to 1, moving average calculator 130 excises the current power vector PXW from future average power vector PXW_avg calculations. Transient eliminator 450 inputs discard flag F to moving average calculator 130 of FIG. 1.

Referring again to FIG. 1, inverse transformer 160 receives excised frequency domain vector XW' from excisor 140. Inverse transformer 160 transforms excised frequency domain vector XW' to time domain output vector y'. In one embodiment, inverse transformer 160 uses an overlap-and-add process to assemble time domain data blocks for output. Inverse transformer 160 inputs time domain output vector y' to output processor 170.

Figure 5:
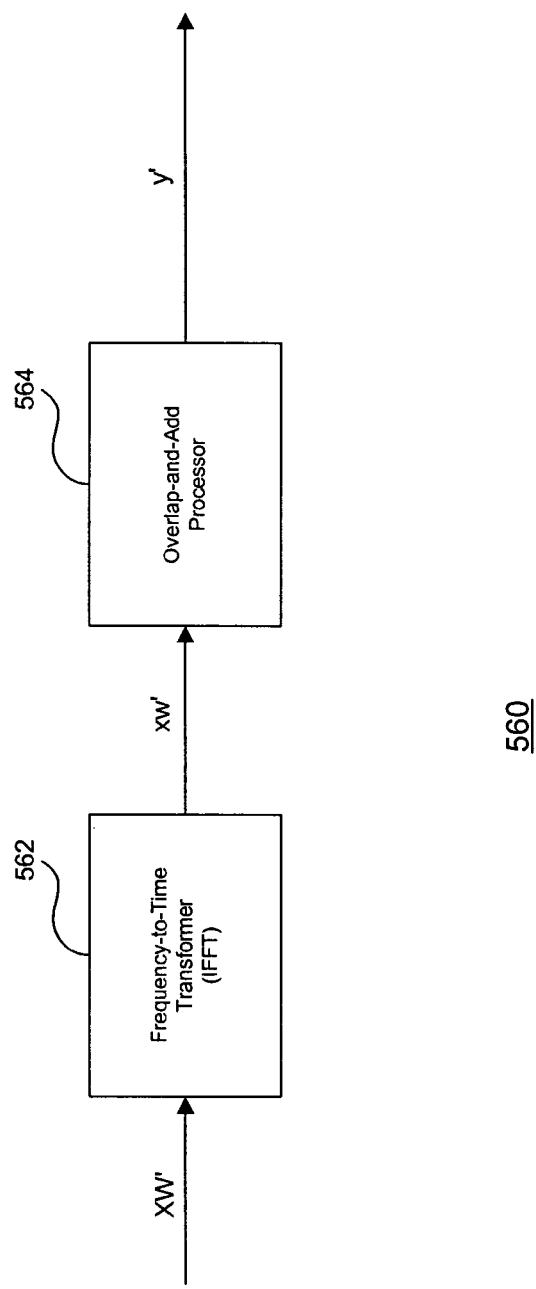
FIG. 5 is a block diagram representing an inverse transformer of a narrowband interference excision device according to one embodiment of the invention.

FIG. 5 is a block diagram representing an inverse transformer of a narrowband interference excision device according to one embodiment of the invention. As shown in FIG. 5, inverse transformer 560 includes frequency-to-time transformer 562 and overlap-and-add processor 564. Transformer 562 receives excised frequency domain vector XW' and transforms excised frequency domain vector XW' from the frequency domain to the time domain to produce time domain vector "xw'." In one embodiment, transformer 562 uses an Inverse Fast Fourier Transform (IFFT) having a block size N according to the following Equation 5:

$$xw(n) = \sum_{k=0}^{N-1} XW(k)e^{(j2\Pi nk/N)}; \qquad \text{(Equation 5)}$$

where
 $0 \leq k \leq (N-1)$
 $XW(k)$=frequency domain input;
 $xw(k)$=time domain output; and
 N=FFT block size.

Transformer 562 inputs time domain vector xw' to overlap-and-add processor 564.

As shown in FIG. 5, overlap-and-add processor 564 receives time domain vector xw'. Overlap-and-add processor 564 adds a portion of a current time domain vector xw' to a previous time domain output vector y' to produce a current time domain output vector y'. In one embodiment, overlap-and-add processor 564 uses a "75% overlap-and-add process" to obtain current time domain output vector y'. The 75% overlap-and-add process adds the tail 75% of a previous time domain output vector y' to the head 75% of current time domain vector xw' to produce current time domain output vector y'. The current time domain output vector y' includes a current output block, which is the head 25% of current time domain output vector y'. Overlap- and -add processor 564 inputs current time domain output vector y' to output processor 170 of FIG. 1.

Referring again to FIG. 1, output processor 170 receives time domain output vector y' from inverse transformer 160. Output processor 170 calculates valid time domain output vector y by multiplying the gain GW of windowed vector xw (FIG. 2) by the current output block. In one embodiment, gain GW equals 1.68 for a Blackman window with 75% overlap-and-add processing. Output processor 170 outputs valid time domain output vector y.

Figure 6:
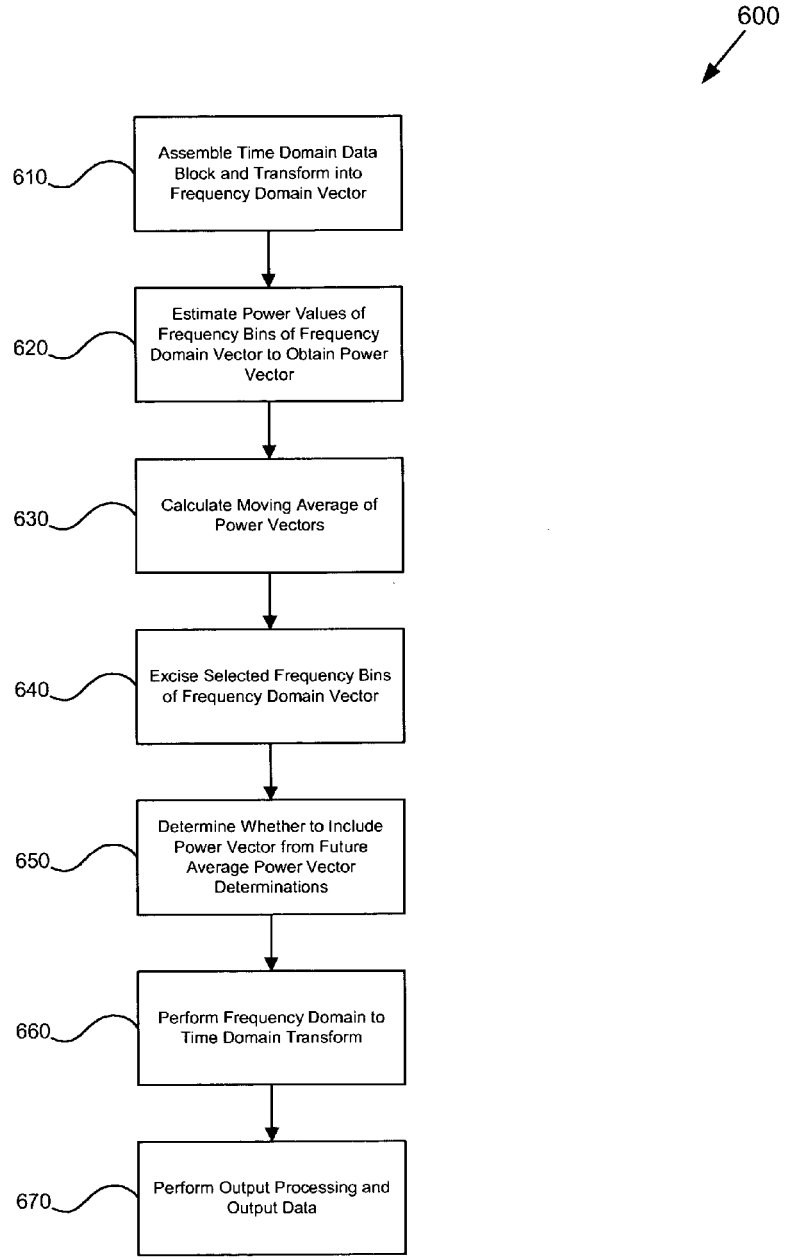
FIG. 6 is a flowchart of an exemplary method that implements an embodiment of the invention.

FIG. 6 is a flowchart of an exemplary method that implements an embodiment of the invention. Certain details and features have been left out of flowchart 600 of FIG. 6 that are apparent to a person of ordinary skill in the art. For example, a step may consist of one or more sub-steps or may involve specialized equipment or materials, as known in the art. While STEPS 610 through 670 shown in flowchart 600 are sufficient to describe one embodiment of the present invention, other embodiments of the invention may utilize steps different from those shown in flowchart 600.

As shown in FIG. 6, the exemplary method begins at STEP 610 in flowchart 600 whereat the method assembles time domain data blocks and transforms time domain data blocks into frequency domain vector XW. In one embodiment, the method uses an overlap-and-add process and a windowing technique to assemble time domain data blocks. In one embodiment, the method assembles time domain data blocks having a length N, wherein N is a power of 2. Exemplary overlap-and-add processes include 75% overlap-and-add processes. Exemplary windowing techniques include Blackman windowing according to Equation 1. In one embodiment, the method uses a FFT to transform time domain data blocks into frequency domain vector XW according to Equation 2. After STEP 610, the method proceeds to STEP 620.

As shown in FIG. 6, at STEP 620, the method estimates power values of frequency bins of the frequency domain vector XW of STEP 610. In one embodiment, the method multiplies frequency domain vector XW by its complex conjugate to obtain power vector PXW comprising power values of frequency bins. After STEP 620, the method proceeds to STEP 630.

At STEP 630, the method calculates a moving average of power vectors or average power vector PXW_avg from power vector PXW estimated at STEP 620 and selected previous power vectors PXW. According to the invention, STEP 630 scales each frequency bin of power vector PXW using power scale factor vector PSFV to obtain scaled power vector PXW', which reduces suppression of high-amplitude frequency bins of the current power vector when averaging power vectors. STEP 630 calculates average power vector PXW_avg from scaled power vector PXW', selected previous power vectors PXW and the power scale factor vector PSFV. The method can discard the current power vector PXW from future average power vector PXW_avg calculations depending on transients. After STEP 630, the method proceeds to STEP 640.

Figure 7:
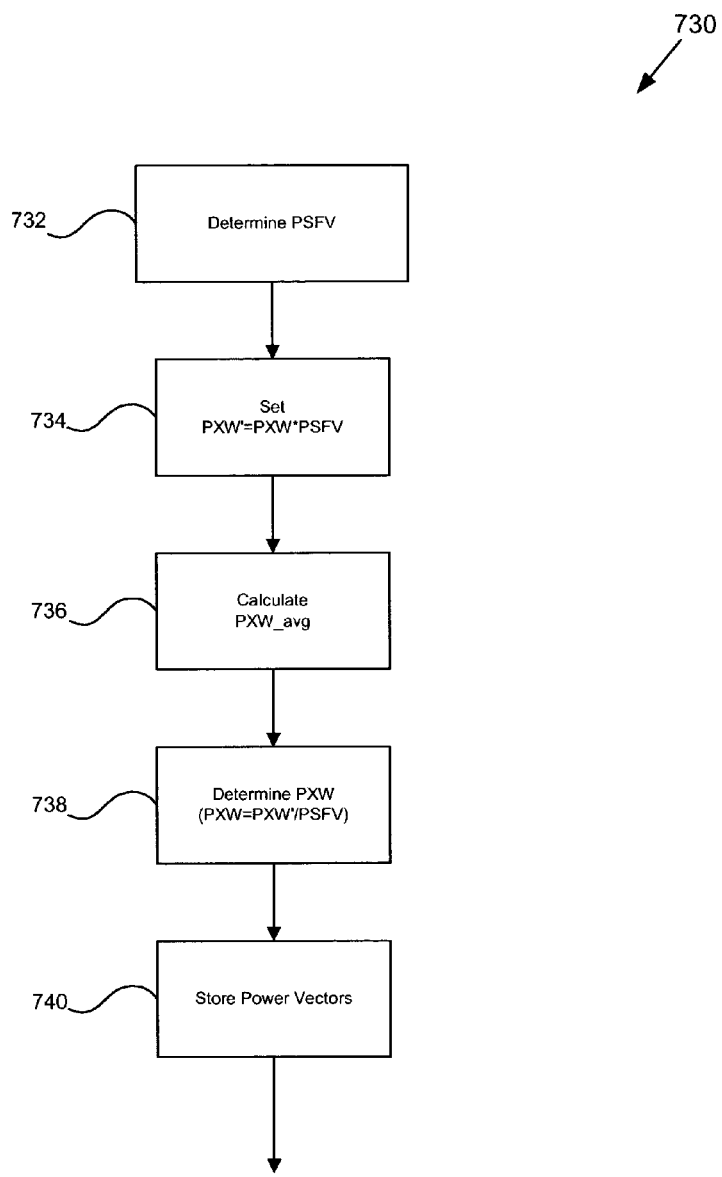
FIG. 7 is a flowchart of an exemplary method that implements an embodiment of the invention.

FIG. 7 is a flowchart of an exemplary method that implements an embodiment of STEP 630 of flowchart 600 of FIG. 6. Certain details and features have been left out of flowchart 730 of FIG. 7 that are apparent to a person of ordinary skill in the art. For example, a step may consist of one or more sub-steps or may involve specialized equipment or materials, as known in the art. While STEPS 732 through 740 shown in flowchart 730 are sufficient to describe one embodiment of the present invention, other embodiments of the invention may utilize steps different from those shown in flowchart 730.

As shown in FIG. 7, the method begins at STEP 732 whereat the method determines a power scale factor vector PSFV. In one embodiment of STEP 732, the method determines whether power values of frequency bins of the current power vector PXW are less than threshold T. An exemplary value for threshold T is shown in Equation 3. If a frequency bin power is less than threshold T, the method sets power scale factor PSF associated with the frequency bin to M, where M is the number of blocks used for averaging, else the method sets power scale factor PSF associated with the frequency bin to 1. The method calculates a PSF for frequency bins of current power vector PXW to form power scale factor vector PSFV, which comprises a plurality of PSF. After STEP 732, the method proceeds to STEP 734 whereat the method calculates scaled power vector PXW' by multiplying current power vector PXW by power scale factor vector PSFV. After STEP 734, the method proceeds to STEP 736.

At STEP 736, the method calculates average power vector PXW_avg. In one embodiment, the method calculates average power vector PXW_avg using Equation 4. After STEP 736, the method can proceed to either STEP 640 of FIG. 6 or STEP 738. At STEP 738, the method determines current power vector PXW. In one embodiment, the method rescales scaled power vector PXW' to current power vector PXW by dividing scaled power vector PXW' by power scale factor vector PSFV. In one embodiment, the method obtains current power vector PXW from STEP 620 of flowchart 600. After STEP 738, the method proceeds to STEP 740 whereat the method stores current power vector PXW along with previous power vectors. After STEP 740, the method proceeds to STEP 640 of FIG. 6. One of ordinary skill in the art shall recognize that the order of STEPS 736 and 738/740 can be switched without departing from the scope and spirit of the present invention because current power vector PXW is calculated for use in calculating subsequent average power vectors PXW_avg. For example, the method STEPS can have the following order: STEP 732, STEP 734, STEP 738, STEP 740 and STEP 736.

Referring again to FIG. 6, the method at STEP 640 excises selected frequency bins of frequency domain vector XW based on moving averages of bin values of average power vector PXW_avg. After STEP 640, the method proceeds to STEP 650.

Figure 8:
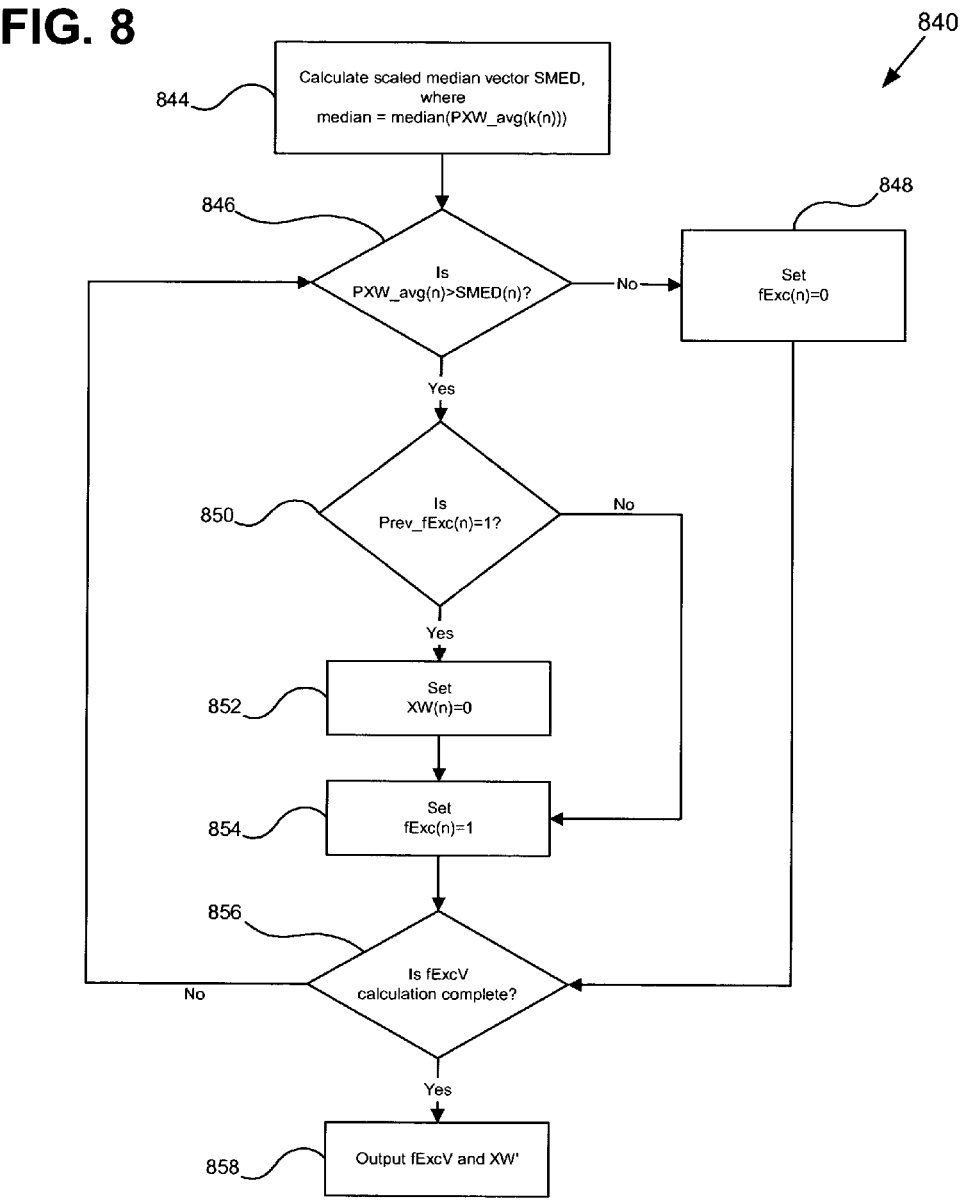
FIG. 8 is a flowchart of an exemplary method that implements an embodiment of the invention.

FIG. 8 is a flowchart of an exemplary method that implements an embodiment of STEP 640 of flowchart 600 of FIG. 6. Certain details and features have been left out of flowchart 800 of FIG. 8 that are apparent to a person of ordinary skill in the art. For example, a step may consist of one or more sub-steps or may involve specialized equipment or materials, as known in the art. While STEPS 844 through 858 shown in flowchart 840 are sufficient to describe one embodiment of the present invention, other embodiments of the invention may utilize steps different from those shown in flowchart 840.

As shown in FIG. 8, the method begins at STEP 844 whereat scaled median vector SMED is calculated. Scaled median vector SMED is calculated by multiplying median vector MED by median threshold MF_T. Median vector MED comprises median values corresponding to frequency bins, where a median value for a specific frequency bin is determined by calculating the median of a set of frequency bins that includes the specific frequency bin. In one embodiment, the median value for a specific frequency bin is determined by calculating the median of a set of frequency bins comprising seven frequency bins that are centered on the specific frequency bin. After STEP 844, the method proceeds to decision STEP 846 whereat the method determines whether an average power value of a frequency bin of average power vector PXW_avg(i.e., PXW_avg(n)) is greater than a scaled median value of a frequency bin of scaled median vector SMED (i.e., SMED(n)). If PXW_avg(n) is greater than SMED(n), then the method proceeds to decision STEP 850, else the method proceeds to STEP 848.

At STEP 848, the method sets excision flag fExc(n) to 0. After STEP 848, the method proceeds to decision STEP 856. At decision STEP 850, the method determines whether previous excision flag Prev_fExc(n) is set to 1. If previous excision flag Prev_fExc(n) is set to 1, the method proceeds to STEP 852, else the method proceeds to STEP 854. At STEP 852, the method excises the frequency bin corresponding to PXW_avg(n) (i.e., set XW(n)) to 0. After STEP 852, the method proceeds to STEP 854. At STEP 854, the method sets excision flag fExc(n) to 1. After STEP 854, the method proceeds to decision STEP 856 whereat the method determines whether excision flag vector fExcV calculation is complete. If not, the method returns to decision STEP 846. If so, the method proceeds to STEP 858 whereat the method outputs excision flag vector fExcV and excised frequency domain vector XW' (i.e., frequency domain vector XW after excision). After STEP 858, the method proceeds to STEP 650 of FIG. 6.

Referring again to FIG. 6, the method at STEP 650 determines whether to include average power vector PXW in future average power vector PXW_avg determinations. In one embodiment, the method determines discard flag percent excised and eliminates transients. In one embodiment, the method determines excision percentage pExc from excision flag vector fExcV and determines whether current power vector PXW should be excised from future calculations of average power vector PXW_avg. In one embodiment, the method at STEP 650 detects transient conditions based on a ratio between current excision percentage pExc and previous excision percentage pExc. After STEP 650, the method proceeds to STEP 660.

Figure 9:
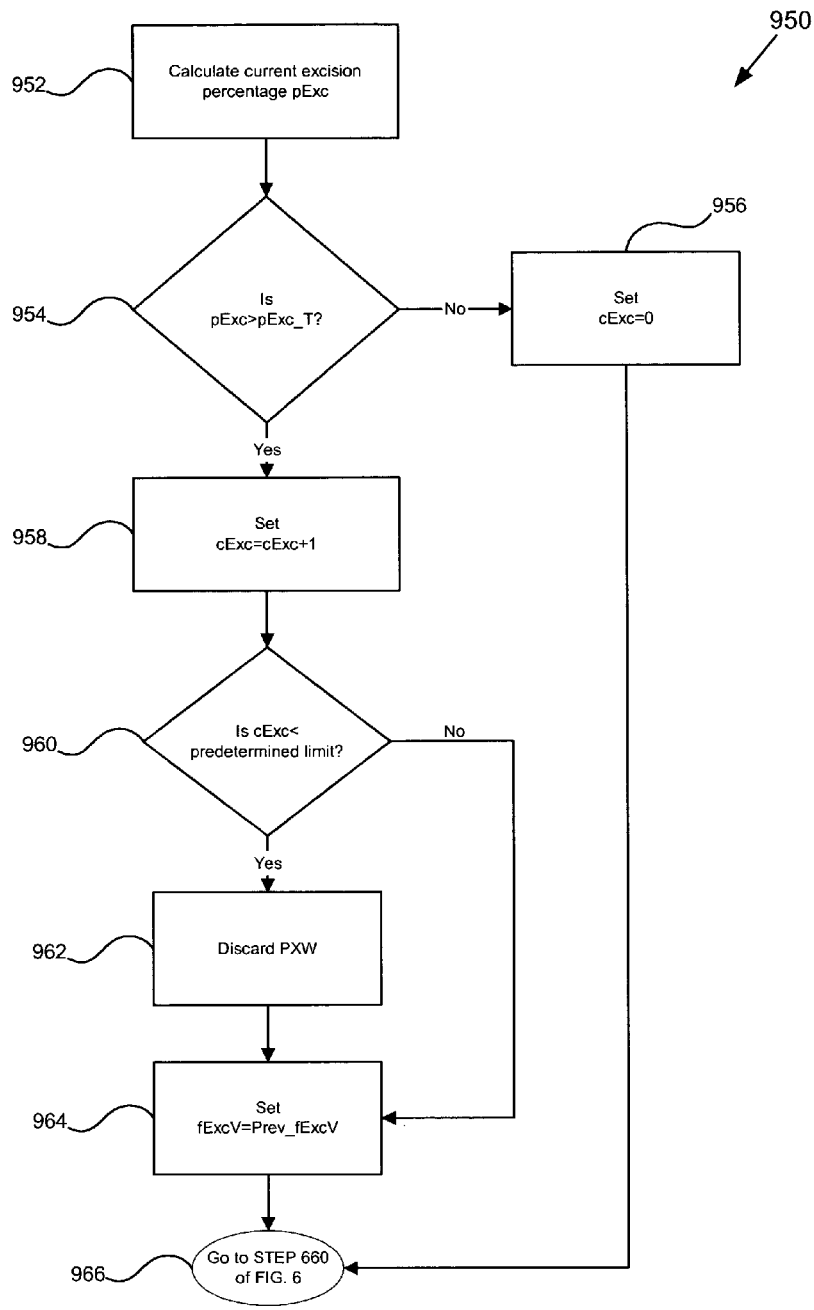
FIG. 9 is a flowchart of an exemplary method that implements an embodiment of the invention.

FIG. 9 is a flowchart of an exemplary method that implements an embodiment of STEP 650 of flowchart 600 of FIG. 6. Certain details and features have been left out of flowchart 950 of FIG. 9 that are apparent to a person of ordinary skill in the art. For example, a step may consist of one or more sub-steps or may involve specialized equipment or materials, as known in the art. While STEPS 952 through 966 shown in flowchart 950 are sufficient to describe one embodiment of the present invention, other embodiments of the invention may utilize steps different from those shown in flowchart 950.

As shown in FIG. 9, the method begins at STEP 952 whereat the method calculates current excision percentage pExc. In one embodiment, the method calculates excision percentage pExc by dividing the summation of excision flags fExc of excision flag vector fExcV by length N. After STEP 952, the method proceeds to decision STEP 954 whereat the method determines whether current excision percentage pExc is greater than pExc_T, where pExc_T is the product of multiplying previous excision percentage pExc by a transient condition threshold. If pExc is greater than pExc_T, then the method proceeds to STEP 958, else the method proceeds to STEP 956. At STEP 956, the method sets exceed counter cExc to 0. After STEP 956, the method proceeds to STEP 966. At STEP 958, the method increments exceed counter cExc by 1. After STEP 958, the method proceeds to decision STEP 960.

At decision STEP 960, the method determines whether exceed counter cExc is less than a predetermined limit. In one embodiment, the predetermined limit is three. If exceed counter cExc is less than the predetermined limit, then the method proceeds to STEP 962, else the method proceeds to STEP 964. At STEP 962, the method discards current power vector PXW from future average power vector PXW_avg calculations. In one embodiment, the method discards current power vector PXW by setting discard flag F to 1. After STEP 962, the method proceeds to STEP 964 whereat the method sets current excision flag vector fExcV to previous excision flag vector Prev_fExcV. After STEP 964, the method proceeds to STEP 966 whereat the method proceeds to STEP 660 of FIG. 6.

Referring again to FIG. 6, the method at STEP 660 performs a frequency domain to time domain transform on excised frequency domain vector XW'. In one embodiment, the method uses an IFFT according to Equation 5. In one embodiment, the method uses an overlap-and-add process to assemble time domain data blocks. After STEP 660, the method proceeds to STEP 670 whereat the method performs output processing and outputs data. In one embodiment, the method at STEP 670 calculates valid time domain output vector y by multiplying the gain GW of windowed vector xw by the current output block. In one embodiment, gain GW equals 1.68 for a Blackman window with 75% overlap-and-add processing.

Figure 10:
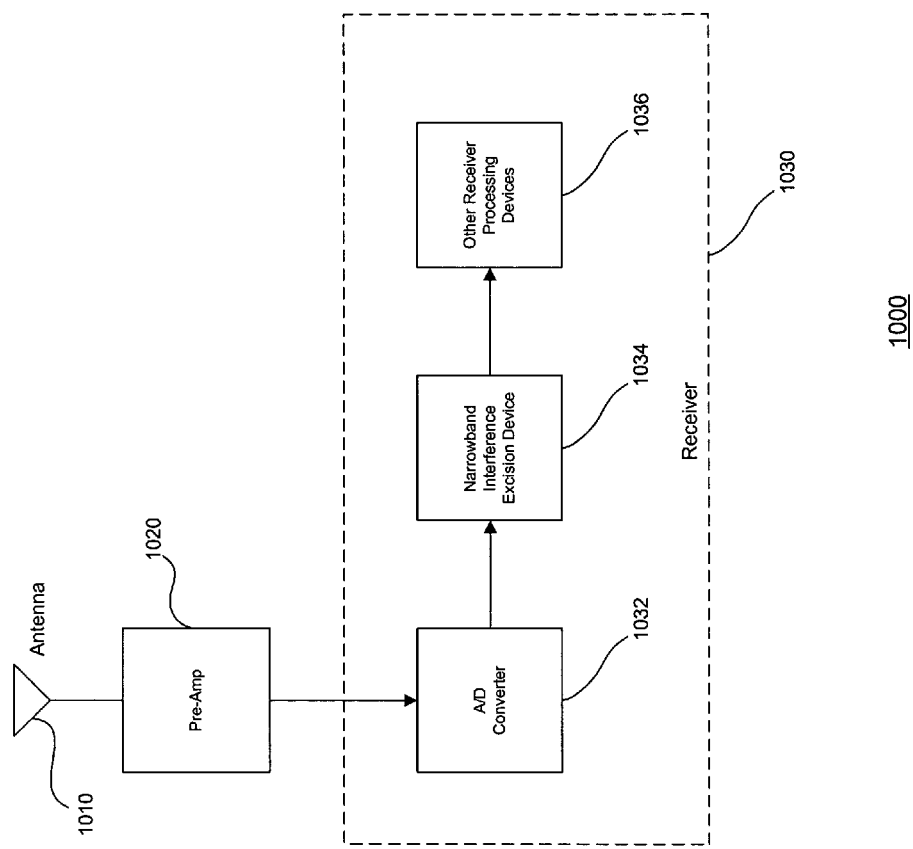
FIG. 10 is a block diagram representing an exemplary ELF receiver application of a narrowband interference excision device according to one embodiment of the invention.

FIG. 10 is a block diagram representing an exemplary ELF receiver application of a narrowband interference excision device according to one embodiment of the invention. As shown in FIG. 10, ELF application 1000 includes antenna 1010, pre-amplifier 1020 and receiver 1030. Antenna 1010 receives rf signals and is operatively coupled to pre-amplifier 1020. Antenna 1010 inputs rf signals to pre-amplifier 1020. Pre-amplifier 1020 is operatively coupled to receiver 1030. Pre-amplifier 1020 inputs analog signals to receiver 1030. Receiver 1030 includes analog-to-digital (A/D) converter 1032, narrowband interference excision device 1034 and other receiver processing devices 1036. A/D converter 1032 is operatively coupled to pre-amplifier 1020 and narrowband interference excision device 1034. A/D converter 1032 receives analog signals from pre-amplifier 1020. A/D converter 1032 converts analog signals to digital signals. A/D converter 1032 inputs digital signals to narrowband interference excision device 1034. Narrowband interference excision device 1034 is operatively coupled to other receiver processing devices 1036. Narrowband interference excision device 1034 removes narrowband interference from digital signals and inputs data to other receiver processing devices 1036. In one embodiment, other receiver processing devices 1036 includes a clipper to suppress atmospheric noise.

From the above description of the invention, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

We claim:

1. A method for excising narrowband interference, the method comprising the steps of:
   a) transforming time domain data into a frequency domain vector having a plurality of frequency bins;
   b) estimating a plurality of power values corresponding to frequency bins of said frequency domain vector to obtain a current power vector;
   c) calculating an average power vector from said current power vector and at least one selected previous power vector;
   d) excising selected frequency bins of said frequency domain vector to produce an excised frequency domain vector; and e) determining whether to include said average power vector in future average power vector determinations.

2. The method of claim 1, wherein said calculating said average power vector step (c) of claim 1 comprises the following sub-steps:
   i) determining a power scale factor vector based on power values of frequency bins of said current power vector;
   ii) calculating said average power vector from said current power vector and said at least one selected previous power vector;
   iii) calculating a scaled power vector from said current power vector and said power scale factor vector; and
   iv) storing said current power vector.

3. The method of claim 2, wherein said determining said power scale factor vector sub-step (i) of claim 2 comprises the following sub-steps:
   (1) determining whether said power value of said current power vector associated with a frequency bin is less than a threshold;
   (2) if said power value of said current power vector associated with said frequency bin is less than a threshold, setting a power scale factor associated with said frequency bin to a number of blocks used for averaging, else setting said power scale factor associated with said frequency bin to 1; and
   (3) repeating steps (1) and (2) until said power scale factor vector comprising a plurality of power scale factors is calculated.

4. The method of claim 2, wherein said calculating said scaled power vector sub-step (iii) of claim 2 comprises multiplying said current power vector by said power scale factor vector.

5. The method of claim 2, wherein said storing said power vectors sub-step (iv) of claim 2 comprises the following sub-steps:
   (1) resealing said scaled power vector to obtain said current power vector; and
   (2) storing said current power vector.

6. The method of claim 5, wherein said resealing sub-step (1) of claim 5 comprises dividing said scaled power vector by said power scale factor vector.

7. The method of claim 2, wherein said storing said current power vector sub-step (iv) of claim 2 comprises the following sub-steps:
   (1) obtaining said current power vector from said estimating a plurality of power values; and
   (2) storing said current power vector.

8. The method of claim 1, wherein said calculating said average power vector step (c) of claim 1 comprises the following sub-steps:
   i) determining a power scale factor vector based on power values of frequency bins of said current power vector;
   ii) calculating a scaled power vector from said current power vector and said power scale factor vector;
   iii) calculating said average power vector from said current power vector and said at least one selected previous power vector; and
   iv) storing said current power vector.

9. The method of claim 1, wherein said determining whether to include said average power vector from future average power vector determinations step (e) of claim 1 comprises the following sub-steps:
   i) calculating a current excision percentage from an excision flag vector; and
   ii) determining whether said current power vector should be excised from future calculations of said average power vector based on a ratio between said current excision percentage and a previous excision percentage.

10. The method of claim 9, wherein said determining sub-step (ii) of claim 9 comprises the following sub-steps:
    (1) determining whether said current excision percentage is greater than a product of said previous excision percentage multiplied by a threshold; and
    (2) if said current excision percentage is greater than a product of said previous excision percentage multiplied by a threshold, setting an exceed counter to zero, else incrementing said exceed counter by one and discarding said current power vector from future calculations of said average power vector.

11. The method of claim 9, wherein said determining sub-step (ii) of claim 9 comprises the following sub-steps:
    (1) determining whether said current excision percentage is greater than a product of said previous excision percentage multiplied by a threshold;
    (2) if said current excision percentage is greater than a product of said previous excision percentage multiplied by a threshold, setting an exceed counter to zero and proceeding to step (4) incrementing said exceed counter by one;
    (3) if said exceed counter is less than a predetermined limit, discarding said current power vector from future calculations of said average power vector, else setting a previous excision flag vector to a current excision flag vector; and
    (4) proceeding with the method.

12. The method of claim 9, wherein said determining sub-step (ii) of claim 9 further comprises setting an excision flag to 1 when said average power vector is to be included in future average power vector determinations.

13. The method of claim 1, wherein method further comprises the following steps:
    f) performing frequency domain to time domain transformation on said excised frequency domain vector to produce a time domain output vector; and
    g) performing output processing on said time domain output vector to produce a valid output vector.

14. A narrowband interference excision device, comprising:
    a) a transformer capable of transforming time domain data to a frequency domain vector comprising a plurality of frequency bins;
    b) a power estimator, operatively coupled to said transformer, capable of receiving said frequency domain vector, and adapted to determine a PXW power vector comprising a plurality of power values that correspond to said plurality of frequency bins;
    c) a moving average calculator, operatively coupled to said power estimator, capable of receiving said PXW power vector and a discard flag, and adapted to determine an average power vector;
    d) an excisor, operatively coupled to said transformer, capable of receiving said frequency domain vector and said average power vector, and adapted to excise selected frequency bins of said plurality of frequency bins and determine an excised power vector and an excision flag vector; and
    e) a transient eliminator, operatively coupled to said excisor and said moving average calculator, capable of receiving said excision flag vector, and adapted to determine whether to include said average power vector from future average power vector determinations and determine said discard flag.

15. The narrowband interference excision device of claim 14, further comprising:
   f) an inverse transformer, operatively coupled to said excisor, capable of receiving said excised power vector, and adapted to transform said excised power vector to a time domain output vector; and
   g) an output processor, operatively coupled to said inverse transformer, capable of receiving said time domain output vector, and adapted to determine a valid time domain output vector.

16. The narrowband interference excision device of claim 14, wherein said moving average calculator comprises:
   i) a power scaling device, operatively coupled to said power estimator, capable of receiving said PXW power vector, and adapted to scale said plurality of power values of said PXW power vector to obtain a scaled power vector; and
   ii) an average power vector computer, operatively coupled to said power scaling device, capable of receiving said scaled power vector and at least one previous power vector, and adapted to determine an average power vector.

17. The narrowband interference excision device of claim 16, wherein said power scaling device comprises:
   (1) a power scale factor computer, operatively coupled to said power estimator, capable of receiving said PXW power vector, and adapted to determine a power scale factor vector; and
   (2) a power scaler, operatively coupled to said power scale factor computer, capable of receiving said PXW power vector and power scale factor vector, and adapted to determine a scaled power vector.

18. The narrowband interference excision device of claim 16, wherein said moving average calculator further comprises:
   iii) a current block power rescaler, capable of receiving said discard flag, and adapted to output a current PXW power vector depending on said discard flag; and
   iv) a previous power block storage device, operatively coupled to said current block power rescaler and said average power vector computer, capable of storing previous PXW power vectors.

19. The narrowband interference excision device of claim 14, wherein said transient eliminator comprises:
   i) an excision percentage calculator, operatively coupled to said excisor, capable of receiving said excision flag vector, and adapted to determine a current excision percentage; and
   ii) a transient excision device, operatively coupled to said excision percentage calculator, capable of receiving said current excision percentage, and adapted to detect transient conditions based on a ratio between a current excision percentage and a previous excision percentage and adapted to set said discard flag depending on detection of transient conditions.

20. The narrowband interference excision device of claim 19, wherein said transient excision device sets said discard flag to indicate transient conditions when an exceed counter is less than a predetermined limit.

21. An Extremely Low Frequency (ELF) receiver, comprising:
   a) an antenna;
   b) a pre-amplifier;
   c) an analog-to-digital converter;
   d) a narrowband interference excision device, comprising:
      i) a transformer capable of transforming time domain data to a frequency domain vector comprising a plurality of frequency bins;
      ii) a power estimator, operatively coupled to said transformer, capable of receiving said frequency domain vector, and adapted to determine a PXW power vector comprising a plurality of power values that correspond to said plurality of frequency bins;
      iii) a moving average calculator, operatively coupled to said power estimator, capable of receiving said PXW power vector and a discard flag, and adapted to determine an average power vector;
      iv) an excisor, operatively coupled to said transformer, capable of receiving said frequency domain vector and said average power vector, and adapted to excise selected frequency bins of said plurality of frequency bins and determine an excised power vector and an excision flag vector; and
      v) a transient eliminator, operatively coupled to said excisor and said moving average calculator, capable of receiving said excision flag vector, and adapted to determine whether to include said average power vector from future average power vector determinations and determine said discard flag; and
   e) at least one receiver processing device.

* * * * *